[19] United States Patent
Lange et al.

[11] 4,320,000
[45] Mar. 16, 1982

[54] BIDIRECTIONAL FLOW FILTER-DRIER

[75] Inventors: Harold T. Lange; Eugene J. Ziegler, both of St. Louis, Mo.

[73] Assignee: Sporlan Valve Company, St. Louis, Mo.

[21] Appl. No.: 178,495

[22] Filed: Aug. 15, 1980

[51] Int. Cl.³ .............................................. B01D 29/36
[52] U.S. Cl. ................................... 210/117; 210/136; 210/437; 210/446; 210/DIG. 6
[58] Field of Search .................. 62/474; 210/117, 136, 210/437, 446, 450, 457, DIG. 6

[56] References Cited

U.S. PATENT DOCUMENTS 3,868,325 2/1975 Otto ...................................... 210/437
4,125,469 11/1978 Henton et al. ....................... 210/446

Primary Examiner—Ivars C. Cintins
Attorney, Agent, or Firm—Cohn, Powell & Hind

[57] ABSTRACT

A filter-drier unit adapted for bidirectional flow in heat pump systems. This filter-drier unit includes a shell having opposed flow ports. Spaced partitions in the shell provide a compartment therebetween, each partition separating a flow port from the compartment. An outlet check valve is connected to each partition, and a perforated tube in the compartment, extends between and interconnects the outlet check valves. A molded desiccant core in the compartment, is disposed about the tube. An inlet check valve is connected to each partition in laterally spaced relation to the outlet check valve connected to the same partition to control the flow from each flow port through an inlet check valve in one partition and into the compartment, through the core and tube thence through an outlet check valve in the other partition, and out the other flow port.

5 Claims, 5 Drawing Figures

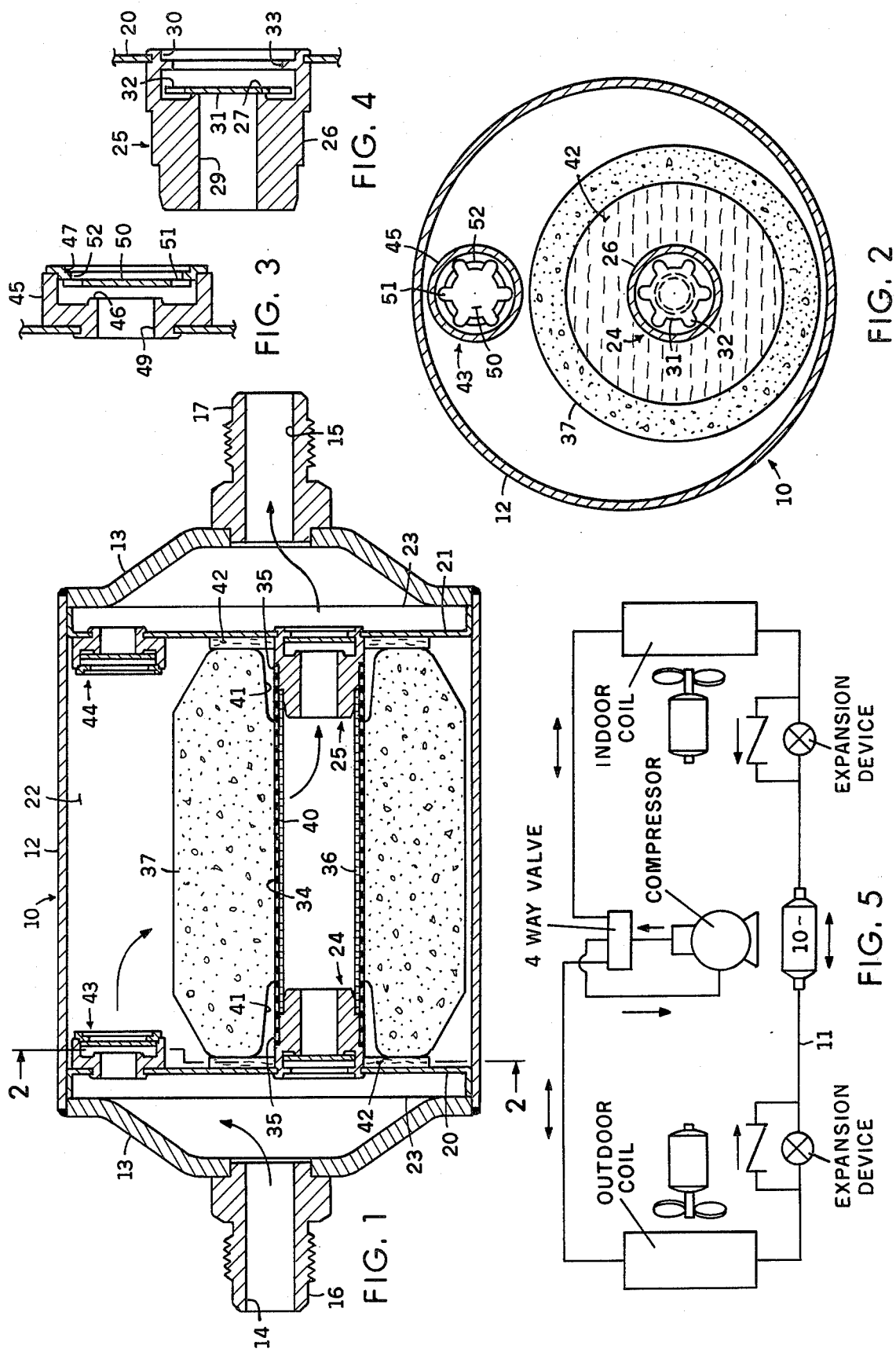

BIDIRECTIONAL FLOW FILTER-DRIER

BACKGROUND OF THE INVENTION

This invention relates generally to improvements in a filter-drier unit, and more particularly to a bidirectional flow filter-drier unit for use in the liquid line of reverse-cycle refrigeration and air-conditioning systems, more commonly known as heat pumps.

There are many filter-driers which have been and can be used in heat pumps, but these filter-driers are designed for refrigerant flow in one direction only so that if there is a backflow, solid contaminants that were picked up in the forward flow direction are released to the system. Consequently, the use of these filter-driers requires the use of two such filter-driers in the liquid line with suitable bypass valves and piping that restrict flow in one direction or requires additional liquid line piping in association with bypass valves when a single filter-drier is utilized.

Another type of bidirectional flow filter-drier assembly is disclosed in U.S. Pat. No. 4,029,580 in which a pair of filter-drier units are provided in a single shell, each filter-drier unit being located in its own compartment at one side of a partition, and being provided with a suitable check valve and with a flow inlet port in the partition to assure flow through only one filter-drier unit in each direction of flow through the shell.

Another type of filter-drier assembly adapted for bidirectional flow in heat pump systems is disclosed in U.S. Pat. No. 4,104,044, wherein a bypass line circumvents each expansion device located in the liquid line, and a filter-drier unit is disposed in each bypass line, the assembly including a check valve enabling flow through the associated bypass line and filter-drier unit in one direction only.

SUMMARY OF THE INVENTION

The present filter-drier unit can be used in the liquid line of a heat pump system without requiring more than two connections or additional liquid line piping, and does not result in the release of any contaminants, previously removed, back into the system upon reversal of liquid flow. Moreover, the present filter-drier unit does not require any bypass lines circumventing the expansion devices in the system.

The present filter-drier unit includes a shell having opposed flow ports, and spaced partitions in the shell providing a compartment therebetween. An outlet check valve is connected to each partition, and a perforated tube in the compartment, extends between and is connected to the outlet check valves. A molded desiccant core in the compartment is disposed about the tube. An inlet check valve is connected to each partition in laterally spaced relation to the outlet check valve connected to the same partition to control flow from each flow port through an inlet check valve in one partition and into the compartment, through the core and tube, thence through an outlet check valve in the other partition, and out of the other flow port.

In one aspect of the filter-drier unit, each partition consists of a sheet metal cup having a resilient peripheral flange that is press-fitted in the shell to connect the partition to the shell and provide a seal therebetween.

In another aspect of the filter-drier unit, the inlet check valves are disposed laterally of the core for communication with the compartment laterally of the core.

In another aspect of the filter-drier unit, the flow ports are aligned on a longitudinal axis of the shell. The outlet check valves and tube are located at one side of the longitudinal axis of the shell for disposing the core closer to one side of the shell than the opposite side, and the inlet check valves are located at the opposite side of the longitudinal axis of the shell for communication with the compartment laterally of the core.

In another aspect of the filter-drier unit, each outlet check valve includes a casing extending inwardly into the compartment from the partition to which the outlet check valve is connected, and opposite ends of the perforated tube are carried by the casings of the outlet check valves. The core is provided with a bore receiving the tube, and is provided with end recesses spaced laterally from the tube at the connection of the tube ends with the valve casings. The tube engages and supports the core axially inwardly of the casings of the outlet check valves to minimize possible breakage of the core when the filter-drier unit is subjected to any shock impact.

Another aspect of the filter-drier unit is provided by a filter pad located in the compartment and engaging each outlet check valve casing and covering the adjacent core recess, each filter pad being disposed between and engaging the core laterally outward of the core recess and the adjacent partition to provide an effective filter seal preventing contaminants from bypassing the core.

BRIEF DESCRIPTION OF THE DRAWINGS

FIG. 1 is a longitudinal cross-sectional view of the filter-drier units;

FIG. 2 is a cross-sectional view taken on line 2—2 of FIG. 1;

FIG. 3 is an enlarged, fragmentary cross-sectional view of the inlet check valve;

FIG. 4 is an enlarged, fragmentary cross-sectional view of the outlet check valve, and FIG. 5 is a diagram of a heat pump system utilizing the present filter-drier unit in the liquid line.

DESCRIPTION OF THE PREFERRED EMBODIMENT

Referring now by characters of reference to the drawings, and first to FIG. 5, it will be understood that the heat pump system in which the present filter-drier unit 10 can be used, includes a compressor connected through a four-way valve to an outdoor coil and an indoor coil, the outdoor and indoor coils being interconnected by a liquid line 11. A pair of expansion devices are located in the liquid line 11, one such expansion device being located ahead of the outdoor coil for use in one mode of operation and another such expansion device being located ahead of the indoor coil for use in the other mode of operation. The filter-drier unit 10 is located in the liquid line 11 between the expansion devices so as to provide protection for both such devices.

The filter-drier unit 10 is best illustrated in FIGS. 1 and 2. The filter drier unit 10 includes a substantially cylindrical shell 12 closed at the ends by caps 13. Flow ports 14 and 15 are provided in the end caps 13 by end fittings 16 and 17 respectively. Preferably, the flow ports 14 and 15 are aligned along a longitudinal axis of the shell 12.

A pair of transverse partitions 20 and 21 are provided in the shell 12, the partitions 20 and 21 being spaced on the longitudinal axis of shell 12 to provide a compartment 22 therebetween. The partition 20 separates the flow port 14 from the compartment 22, and the other partition 21 separates the other flow port 15 from the compartment 22.

More particularly, each transverse partition 20 and 21 consists of a sheet metal cup having a resilient peripheral flange 23 press-fitted in the shell 12 to connect the partition 20–21 to the shell 12 and provide a seal therebetween.

Mounted and connected to each partition 20–21, is an outlet check valve referred to generally by 24–25 respectively. For reasons which are discussed later, the outlet check valves 24–25 are disposed in axially alignment at one side of the longitudinal axis of shell 12. The details of construction of the outlet check valves 24–25 is disclosed more clearly in FIG. 4. While FIG. 4 specifically shows the outlet check valve 25, it will be understood that the check valve 24 is of the identical construction.

For example, in FIG. 4, the outlet check valve 25 includes a tubular casing 26 provided with an inlet valve port 29 as defined by a valve seat 27, and an outlet port 30. Movably mounted in the tubular casing 26 and selectively engaging the valve seat 27 under liquid pressure, is a valve plate 31. The valve plate 31 is provided with radially extending, peripherally spaced fingers 32. A cylindrical, tubular stop 33 formed in the tubular casing 26, engages the valve plate fingers 32 to limit the movement of the valve plate 31 as it moves away from its valve seat 27 to open the valve port 29 under liquid pressure. When the valve port 29 is opened, the flow is through the port 29, between the valve plate fingers 32 and past the stop 33 for discharge through the outlet 30. Liquid pressure on the opposite side of the valve plate 31 will move the valve plate 31 against the valve seat 27 and close the valve port 29, thereby preventing backflow in the filter-drier unit 10. The tubular casing 26 is fixed to the partition 20 by staking at the valve outlet 30.

The tubular casings 26 of the axially aligned outlet check valves 24 and 25 extend inwardly from the associated partitions 20 and 21 respectively, into the intervening compartment 22. Disposed in the compartment 22 and extenting between the outlet check valves 24 and 25, is a perforated tube 34. More particularly, the perforated tube 34 includes opposed ends 35 that receive the inwardly extending tubular casings 26 of the outlet check valves 24–25. The tube 34 is also located at one side of the longitudinal axis of the shell 12.

Located within and operatively constituting a part of the tube 34, is a one hundred (100) mesh tubular screen 35 extending between and receiving at its ends, the tubular casings 26 of the outlet check valves 24–25. The tube 34 including the screen 35 serves to collect any loose core particles which might be abraded off during assembly, and to collect any other contaminant particles during operation.

A molded desiccant core 37 is located in the compartment 22, and is supported between the partitions 20–21 on the cylindrical tube 34. More particularly, the core 37 is provided with a longitudinal bore 40 that receives the cylindrical tube 34. Each end of the core 37 is provided with an end recess 41 spaced laterally from the tube 34 at the connection of the tube ends 35 with the valve casings 26 of outlet check valves 24–25. Specifically, the tube 34 engages and supports the core 37 axially inward of the casings 26 of the outlet check valves 24–25. This structural arrangement minimizes the possibility of core breakage at the core ends when the filter-drier unit is subjected to a shock impact.

At each end of the core 37, a filter pad 42 is provided between the core end and the adjacent partition 20 or 21. Each filter pad 42, located in the compartment 22, engages the adjacent outlet check valve casing 26 and covers the adjacent core recess 41, the pad 42 being disposed between and engaging the core 37 laterally outward of the core recess 41, and the adjacent partition 20 or 21. The pads 42, preferably constructed of glass fiber, provide a seal that precludes dirt from bypassing the core 37.

An inlet check valve indicated by 43 is connected to partition 20 in laterally spaced relation to the outlet check valve 24 connected to the same partition 20. Another inlet check valve 44 is connected to partition 21 in laterally spaced relation to the outlet check valve 25 connected to the same partition 21. It will be understood that the inlet check valves 43–44 communicate with the compartment 22 laterally of the core 37. The outlet check valves 24–25 and the interconnecting tube 34 are located at one side of the longitudinal axis of the shell 12 for disposing the core 37 closer to one side of the shell 12 than the opposite side. The inlet check valves 43–44 are located at the opposite side of the longitudinal axis of the shell 12 for communication with the compartment 22 laterally of the core 37.

The details of construction of the inlet check valves 43–44 are best shown in FIG. 3. While FIG. 3 illustrates the construction particularly of the inlet check valve 43, it will be understood that the other inlet check valve 44 has the same construction. The inlet check valve 43 includes a tubular casing 45 provided with an inlet port 49 as defined by a valve seat 46 and an outlet 47. Movably mounted in the tubular casing 45 and selectively engaging the valve seat 46 under liquid pressure, is a valve plate 50. The valve plate 50 is provided with radially extending, peripherally spaced fingers 51. A cylindrical, tubular stop 52 engages the valve plate fingers 51 to limit the movement of the valve plate 50 as it moves away from its valve seat 46 to open the valve port 49 under liquid pressure. When the valve port is opened, the flow is through the port 49, between the valve plate fingers 51 and past the stop 52 for discharge through the outlet 47 and into the compartment 22 at one side of the core 37. Liquid pressure on the opposite side of the valve plate 50 will move the valve plate 50 against the valve seat 46 and close the valve port 49, thereby preventing backflow in the filter-drier unit. The casings 45 of the inlet check valves 43–44 are connected to the partitions 20–21 respectively by staking. The casings 45 of the inlet check valves 43–44 extend inwardly into the compartment 22.

It is thought that the operation of the filter-drier unit 10 has become apparent from the foregoing detailed description of parts, but for completeness of disclosure, such operation will be briefly described.

With the filter-drier unit 10 disposed in the liquid line 11 of a heat pump system in a manner shown in FIG. 5, it will first be assumed that flow into the shell 10 through its associated shell port 14 as shown in FIG. 1. As the refrigerant liquid flow passes into the shell 10 through the port 14, the outlet check valve 24 will close to preclude backflow through such filter-drier unit. The liquid will pass through the inlet check valve 43 which is opened under liquid pressure, and will pass into the compartment 42 at one side of the core 37. The liquid pressure in the compartment 22 will immediately close the other inlet check valve 44 so that the liquid flow from the inlet check valve 43 passes through the core 37, through the tube 34 and screen 36, and into the interior of the tube 34. The liquid pressure opens the outlet check valve 25 so that the liquid flow passes through the outlet check valve 25, and out through the flow port 15.

Flow of the refrigerant liquid in the opposite direction in the refrigerant liquid line 11 will cause the liquid to enter the shell 12 through the flow port 15. The liquid pressure will cause the outlet check valve 25 to close to preclude backflow through the filter-drier unit 10. The liquid pressure will also cause the inlet check valve 44 to open so that the liquid will pass through the inlet check valve 44 into the compartment 22 at the side of the core 37. The liquid pressure in the compartment 22 will cause the other inlet check valve 43 to close so that the liquid will flow through the core 37, and through the tube 34 and screen 36 into the interior of the tube 34. Further, the liquid pressure will cause the outlet check valve 24 to open so that the refrigerant liquid will pass through the outlet check valve 24, and out of the shell 12 through the flow port 14.

We claim as our invention:

1. A filter-drier unit for heat pump systems, comprising:
   (a) a shell having opposed ends, each shell end being provided with a flow port,
   (b) spaced partitions in the shell providing a compartment therebetween, one partition separating one flow port from the compartment and the other partition separating the other flow port from the compartment,
   (c) an outlet check valve connected to each partition,
   (d) a perforated tube in the compartment and extending between and connected to the outlet check valves,
   (e) a molded desiccant core in the compartment and disposed about the tube,
   (f) an inlet check valve connected to each partition in laterally spaced relation to the outlet check valve connected to the same partition, to control flow from each flow port through an inlet check valve in one partition and into the compartment, through the core and tube, thence through an outlet check valve in the other partition, and out the other flow port,
   (g) the flow ports being aligned on a longitudinal axis of the shell,
   (h) the outlet check valves and tube being located at one side of the longitudinal axis of the shell for disposing the core closer to one side of the shell than the opposite side, and
   (i) the inlet check valves being located at the opposite side of the longitudinal axis of the shell for communication with the compartment laterally of the core.

2. A filter-drier unit for heat pump systems, comprising:
   (a) a shell having opposed ends, each shell end being provided with a flow port,
   (b) spaced partitions in the shell providing a compartment therebetween, one partition separating one flow port from the compartment and the other partition separating the other flow port from the compartment,
   (c) an outlet check valve connected to each partition,
   (d) a perforated tube in the compartment and extending between and connected to the outlet check valves,
   (e) a molded desiccant core in the compartment and disposed about the tube,
   (f) an inlet check valve connected to each partition in laterally spaced relation to the outlet check valve connected to the same partition, to control flow from each flow port through an inlet check valve in one partition and into the compartment, through the core and tube, thence through an outlet check valve in the other partition, and out the other flow port,
   (g) each outlet check valve including a casing extending inwardly into the compartment from the partition to which the outlet check valve is connected,
   (h) the perforated tube including opposite ends carried by the casings of the outlet check valves, and
   (i) the core being provided with a bore receiving the tube, and being provided with end recesses spaced laterally from the tube at the connection of the tube ends with the valve casings.

3. A filter-drier as defined in claim 2, in which:
   (j) the tube engages and supports the core axially inward of the casings of the outlet check valves for minimizing shock impact damage to the core.

4. A filter-drier as defined in claim 3, in which:
   (k) a filter pad is located in the compartment and engages each outlet check valve casing, each filter pad engaging the core laterally outward of the core recess to cover the core recess, and engaging the adjacent partition to provide a seal between the core and the partition.

5. A filter-drier unit for heat pump systems, comprising:
   (a) a shell having opposed ends, each shell end being provided with a flow port,
   (b) spaced partitions in the shell providing a compartment therebetween, one partition separating one flow port from the compartment and the other partition separating the other flow port from the compartment,
   (c) an outlet check valve connected to each partition,
   (d) a perforated tube in the compartment and extending between and connected to the outlet check valves,
   (e) a molded desiccant core in the compartment and disposed about the tube,
   (f) an inlet check valve connected to each partition in laterally spaced relation to the outlet check valve connected to the same partition, to control flow from each flow port through an inlet check valve in one partition and into the compartment, through the core and tube, thence through an outlet check valve in the other partition, and out the other flow port,
   (g) the flow ports being aligned on a longitudinal axis of the shell,
   (h) the outlet check valves and tube being located at one side of the longitudinal axis of the shell for disposing the core closer to one side of the shell than the opposite side,
   (i) the inlet check valves being located at the opposite side of the longitudinal axis of the shell and laterally of the core for communication with the compartment laterally of the core, (j) each outlet check valve including a casing extending inwardly into the compartment from the partition to which the outlet check valve is connected,
(k) the perforated tube including opposite ends carried by the casings of the outlet check valves, and
(l) the core being provided with a bore receiving the tube, and being provided with end recesses spaced laterally from the tube at the connection of the tube ends with the valve casings, the tube engaging and supporting the core axially inward of the casings of the outlet check valves for minimizing shock impact damage to the core.

* * * * *